United States Patent [19]

Siegler et al.

[11] 4,093,429

[45] June 6, 1978

[54] GAS SEPARATION SYSTEM

[75] Inventors: Manfred Siegler, San Jose; Ted Lee Wong, Sunnyvale, both of Calif.

[73] Assignee: General Electric Company, San Jose, Calif.

[21] Appl. No.: 642,460

[22] Filed: Dec. 19, 1975

[51] Int. Cl.² .................. B01D 51/00; B01D 53/04
[52] U.S. Cl. ................................. 55/58; 55/62; 55/66; 55/75
[58] Field of Search ............. 55/21, 58, 66, 74, 163, 55/179, 208, 387, 389, 62, 25, 26, 33, 75

[56] References Cited

U.S. PATENT DOCUMENTS

| 3,176,444 | 4/1965 | Kiyonaga | 55/26 |
|---|---|---|---|
| 3,323,288 | 6/1967 | Cheung et al. | 55/58 |
| 3,534,529 | 10/1970 | Mattia | 55/62 |
| 3,713,273 | 1/1973 | Coffee | 55/74 X |
| 3,768,232 | 10/1973 | Farber et al. | 55/58 |
| 3,871,842 | 3/1975 | Queiser et al. | 55/66 X |
| 3,890,121 | 6/1975 | Thomas | 55/62 |

OTHER PUBLICATIONS

Gitterman et al., Cryogenic Adsorption Systems for Radioactive Gas Cleanup, Conf. on Reactor Op. Exp., 8/1971, pp. 42 & 43.
Liuzzi et al., Use of Activated Charcoal for the Collection & Containment of $^{133}$Xe, 9/1972, J. Nucl. Med., vol. 13, No. 9, pp. 673-676.
Yuasa et al., Selective Adsop.-Desop. Method for Enrichment of Kr, CONF-740807, vol. 1, UC-70, 3/1975, pp. 177-202.

Primary Examiner—Charles N. Hart
Assistant Examiner—Robert H. Spitzer
Attorney, Agent, or Firm—Ivor J. James, Jr.; Samuel E. Turner; Sam E. Laub

[57] ABSTRACT

A fixed bed adsorption gas separation system wherein the use of a combination of temperature and pressure swing cycles together with a chromatographic separation step provides separation of gases with a minimum number of stages.

10 Claims, 8 Drawing Figures

STEP 1

STEP 2

STEP 3

STEP 4

STEP 1

STEP 2

STEP 3

STEP 4

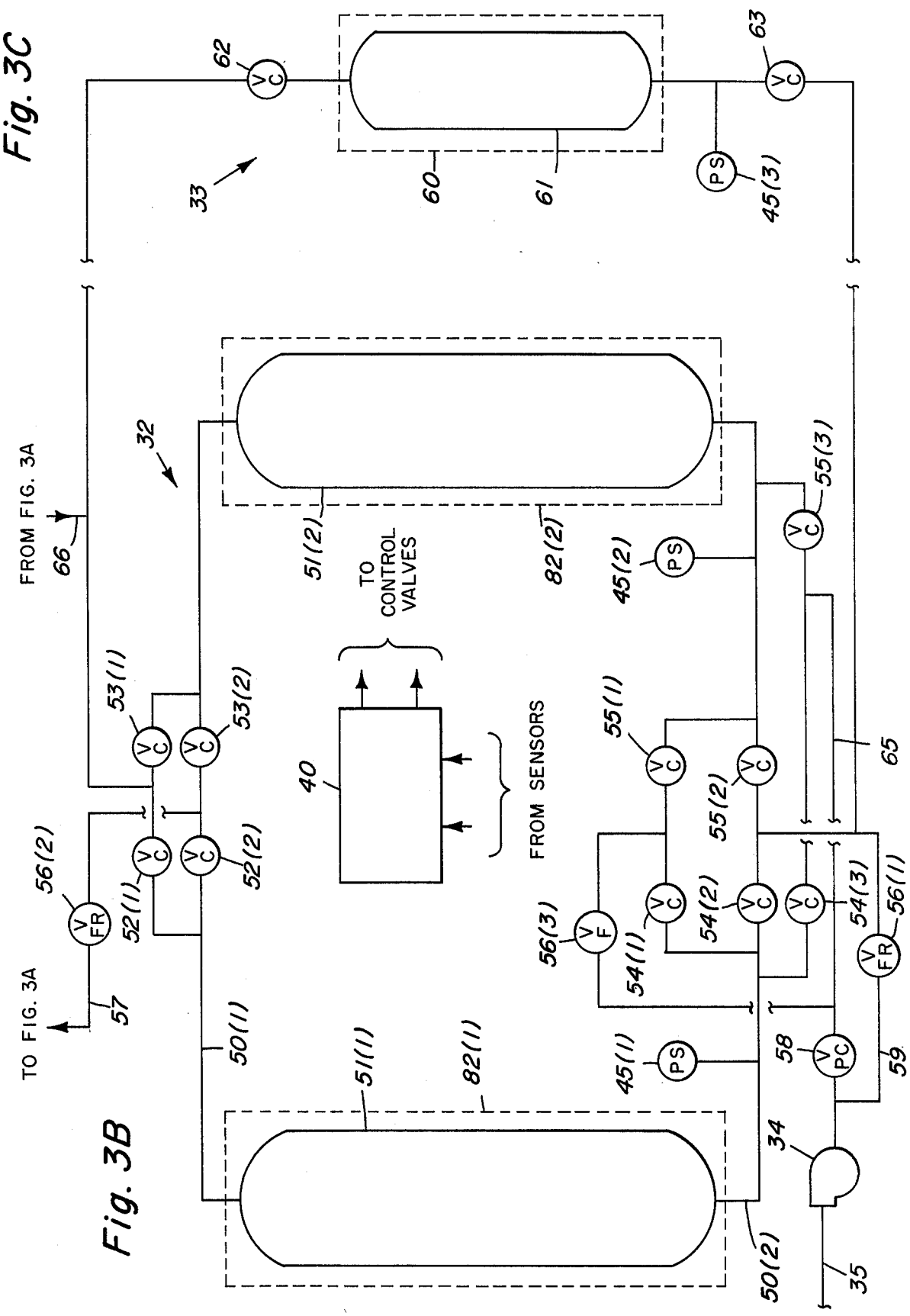

| TIME PERIOD (16 HOUR CYCLE) | | ADSORBER COLUMN 51(1) | | | | | | | Direction of Gas Flow | EXIT GAS |
|---|---|---|---|---|---|---|---|---|---|---|
| No. | Duration (Hours) | Temperature °F | Pressure atm absolute | VALVES | | | | | | |
| | | | | 52(1) | 52(2) | 54(1) | 54(2) | 54(3) | | |
| 1 | 2 | -90 | 0.9 → 0.1 | closed | closed | closed | open | closed | forward | to Vent 35 |
| 2 | 4 | -90 → 225 | 0.9 → 0.1 | " | open | " | closed | " | reverse | to Separator 38 |
| 3 | 4 | 225 | 0.1 | " | " | open | " | " | " | " |
| 4 | 3 | 225 → -90 | 0.1 → 0.9 | " | closed | " | " | " | " | — |
| 5 | 3 | -90 | 0.9 | " | " | closed | " | " | — | — |

Valves 53(2), 55(1), and 55(2) are closed
Valves 53(1) and 55(3) are open

Fig. 5

GAS SEPARATION SYSTEM

BACKGROUND

Fixed bed adsorption systems are well known. Such systems and their many applications are discussed, for example, by H. M. Barry, *Chem. Eng.*, Feb. 8, 1960, pp. 105–120. Such systems are also discussed in a three part series by G. M. Lukchis, *Chem. Eng.*, June 11, 1973, pp. 111–116, July 9, 1973, pp. 83–87 and Aug. 6, 1973, pp. 83–90.

Briefly adsorption is the condensation of gas (or liquid) molecules on the surface of a solid due to attractive forces, called Van der Waal's forces, which are similar in nature to those forces responsible for surface tension in liquid. Since the total surface energy of the adsorbent is equal to the product of the surface energy per unit area and the total surface area, large surface is the primary consideration in the selection of a material for use as an absorbent. The requirement of large surface area and the desire to minimize the volume of the adsorption system leads to the use of highly porous solids as adsorbents. Among the widely used adsorbents, as discussed in the foregoing references, is, for example, activated carbon.

The force of attraction of the adsorbent is not the same for all gas molecules. Rather, the force of attraction is related to the size of the pores of the adsorbent relative to the size of the adsorbed molecule. The more nearly the pore size is to the diameter of the adsorbed molecule, the greater the attraction. This phenomenon results in selective adsorption of various gases whereby the adsorption process can be used for the separation of such gases.

In known fixed bed adsorption gas separation systems the inlet gas mixture is applied to a bed of adsorption material until breakthrough of the adsorbate (the adsorbed gas) at which time the inlet gas is diverted to a parallel bed and the saturated bed is then regenerated with heat and/or vacuum. The degree of concentration of the adsorbate obtained during one such cycle is limited by the co-adsorption of other gases on the bed. Therefore, if a higher concentration of the adsorbate is required, the adsorbate is applied to a second stage bed, etc. To achieve high concentration in this manner, many stages are required.

An object of the present invention is to improve the concentrating efficiency of each stage to thereby reduce the amount of equipment and, therefore, the cost of a gas separation system.

SUMMARY

This and other objects of the invention are achieved by a system wherein the process includes a chromatographic separation step. More specifically, the inlet gas mixture is applied to a bed or column of adsorbent material, at a relatively low temperature, until some fraction less than the full length of the bed is saturated with the adsorbate, that is, for some fraction of the adsorbent bed breakthrough capacity. This leaves the downstream portion of the bed free of adsorbate.

The pressure in the bed container is then reduced by a vacuum pump connected to the downstream end of the bed. This removes the co-adsorbed gases including a portion of the adsorbate from the saturated upstream portion of the bed. However, the stripped adsorbate is re-adsorbed on the clean downstream portion of the adsorber bed whereby the effluent gas is free of and uncontaminated with the adsorbate. In this manner, a chromatographic separation of the co-adsorbed gases is obtained whereby the efficiency of the adsorber bed in concentrating the adsorbate is greatly increased.

DRAWING

The invention is described in greater detail hereinafter with reference to the accompanying drawing wherein:

FIG. 3B is a diagrammatic illustration of a gas removal system employing single stage, parallel separation systems;

FIG. 3C is a diagrammatic illustration of a gas storage system;

FIG. 5 is a chart of valve and operating conditions illustrating operation of the system of FIG. 3B during an operating cycle.

GENERAL DESCRIPTION

Figure 1:
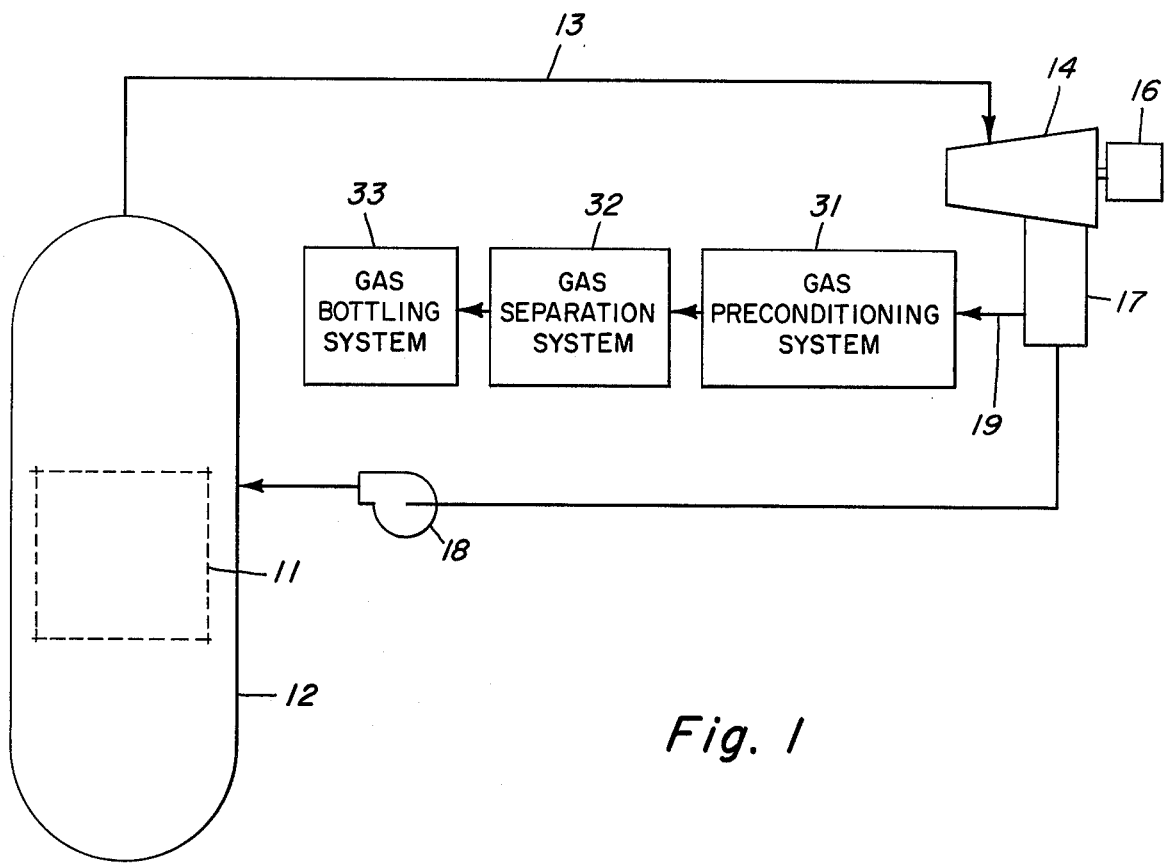
FIG. 1 is a schematic illustration of a nuclear power reactor system.

While the invention is generally useful in adsorption systems for various applications, the invention is described herein, by way of example, as applied to a system for removing radioactive noble gases from the off gases of a nuclear reactor system. Such a well-known system is shown in simplified schematic form in FIG. 1 wherein a nuclear fuel core 11 is contained in a pressure vessel 12. A coolant (such as light water) is circulated through the core (by means not shown) whereby the water is heated to provide a head of steam in the upper poriton of the pressure vessel. The steam is taken from the vessel 11 through a line 13 and applied to a load such as a steam turbine 14 which may drive an electrical generator 16. The turbine exhausts to a condenser 17 and the resulting condensate is returned as feedwater to the vessel 12 by a feedwater pump 18. Off gases are removed from the system via a line 19 from a condenser 17 by an off gas system comprising a gas pre-conditioning system 31, a gas separation system 32 and a gas bottling system 33. (The gas bottling system 33 is described and claimed in copending U.S. patent application Ser. No. 642,461 filed on even date herewith.)

The off gases from such a reactor system may include the following: water vapor; non-radioactive hydrogen ($H_2$) and oxygen ($O_2$) produced by radiolytic decomposition of the coolant; radioactive isotopes of nitrogen, oxygen and fluorine formed by nuclear reactions with oxygen; trace amounts of radioactive fuel fission products such as krypton, xenon and iodine; and a substantial quantity of air resulting mainly from inleakage because of the subatmospheric pressure of the condenser.

Previous off gas treatment systems have generally followed the design philosophy of holding up or delaying the atmospheric release of the off gases for a time sufficient to allow substantial decay of the radioactivity. An elementary system of this type consists simply of a relatively long pipe within which radioactive decay takes place before release of the gases to a stack.

More elaborate systems utilizing adsorption beds for delay of the longlife radioactive noble gases have been suggested and used. Such systems have been discussed, for example, by Schroeder et al, "Offgas Facility at the Gundremmingen Nuclear Power plant" *Kerntechnich*, 13 (1971) No. 5, p. 205, and by Browning et al, "Removal of Fission Product gases from Reactor Off-Gas Streams by Adsorption" ORNL cf 59-6-47 (1959).

For more advanced systems it is proposed to remove, concentrate and store, rather than delay and release, the long-lived radioactive noble gases, such as the isotopes of krypton because of the relatively long half lives of some of these isotopes, most notable of which is krypton-85 with a half life of about ten years. The present invention is particularly useful in such a system because of its efficiency of concentration.

Figure 2:
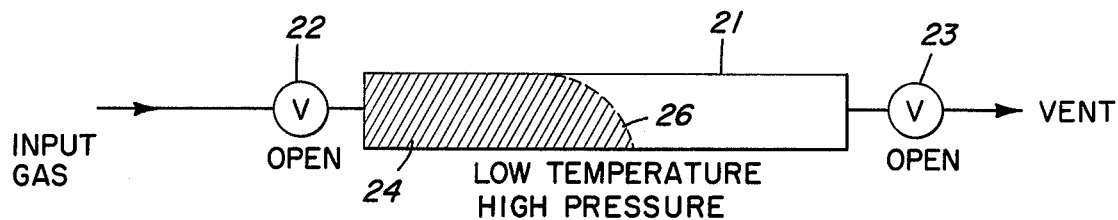
FIG. 2 is a schematic illustration of the basic process of the invention.
Figure 2:
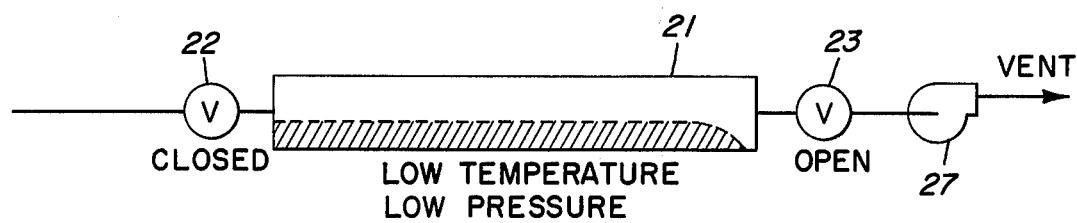
Figure 2:
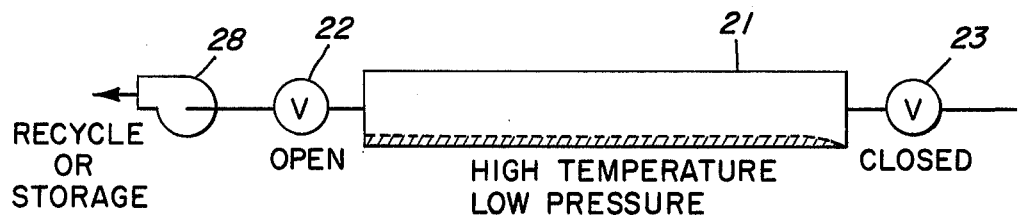
Figure 2:
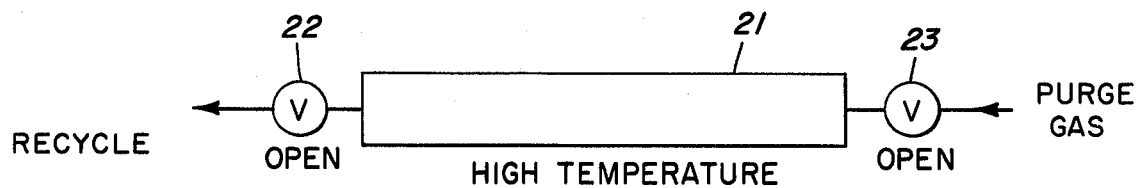

The basic process of the gas separation and concentration process of the system of the invention is illustrated schematically in FIG. 2 which shows the four steps of operation of a bed or column 21 contained in a pressure vessel and consisting of adsorption material or adsorbent such as activated carbon, a molecular sieve, silica gel or the like. This adsorbent is selected for high adsorption of the radioactive noble gases (krypton and xenon).

In step 1 the bed 21 is at a relatively low temperature to increase the adsorptive capacity of the adsorbent. An inlet valve 22 is open to admit the pre-conditioned reactor off gas from preconditioning system 31 (FIG. 1) and an outlet valve 23 is open to vent the gases in the mixture that are not adsorbed. As explained in greater detail in the hereinbefore mentioned article by G. M. Lukchis, it is characteristic of such adsorbent beds that they become saturated with the adsorbate progressively from the inlet end of the bed as indicated by the hatched area 24. In other words as the reactor off gas is fed to the bed, the saturation front 26 moves to the right until the entire bed is saturated with the adsorbate.

However it is a feature of this invention that the reactor off gas is applied to bed 21 only until some percentage (for example 50-75 percent) of the bed length is saturated with the adsorbate. At this point, the inlet valve 22 is closed as shown in step 2 (the reactor off gas being diverted, for example, to a parallel bed —not shown in FIG. 2). The pressure in the vessel containing bed 21, still at low temperature, is reduced through the open outlet valve 23 by, for exmaple, a vacuum pump 27. By this step a substantial portion (for exmaple, 70 percent) of the co-adsorbed air and other non-noble gases are removed and the noble gas adsorbate (krypton and xenon) stripped from the saturated upstream portion of the bed is readsorbed and retained on the clean downstream portion of the bed. This step is carried out for a period of time just short of the time required for breakthrough of the noble gas adsorbate from the bed. An outstanding advantage is that the thus removed gases is free of the noble gases and these removed gases, therefore, are uncontaminated and can be vented, for example, directly to the atmosphere. In this manner a chromatographic separation of the noble gases from the other gases is achieved and the concentration of the noble gases is greatly increased. For example, a concentration factor for Kr in excess of 20 can be achieved during a cycle of operation.

The subsequent steps 3 and 4 constitute a process of regeneration of the bed 21 by removal of the adsorbate in preparation for a second cycle of operation. In step 3 the outlet valve 23 is closed, the bed temperature is increased to decrease the adsorptive capacity of the adsorbent and the pressure in the vessel containing the bed 21 is reduced through open inlet valve 22 by, for example, a vacuum pump 28. The concentrated adsorbate is thus desorbed from the bed 21. (Alternatively, the adsorbate may be removed from the outlet end through valve 23 with inlet valve 22 closed.) The effluent noble gases from the outlet of pump 28 may be bottled or may be recycled or applied to a second stage adsorption bed for further concentration.

In step 4 the residual traces of the noble gases are flushed from the bed 21 by applying a purge gas (such as air) through opened valve 23. (The effluent gases from valve 22 may be fed, with the reactor off gas, to a parallel second bed of the first stage of a system as described hereinafter.)

The foregoing steps complete the basic process of the invention and the bed 21 is ready to again receive input gas, as shown in step 1, for another cycle of operation.

FIRST EMBODIMENT

Figure 3A:
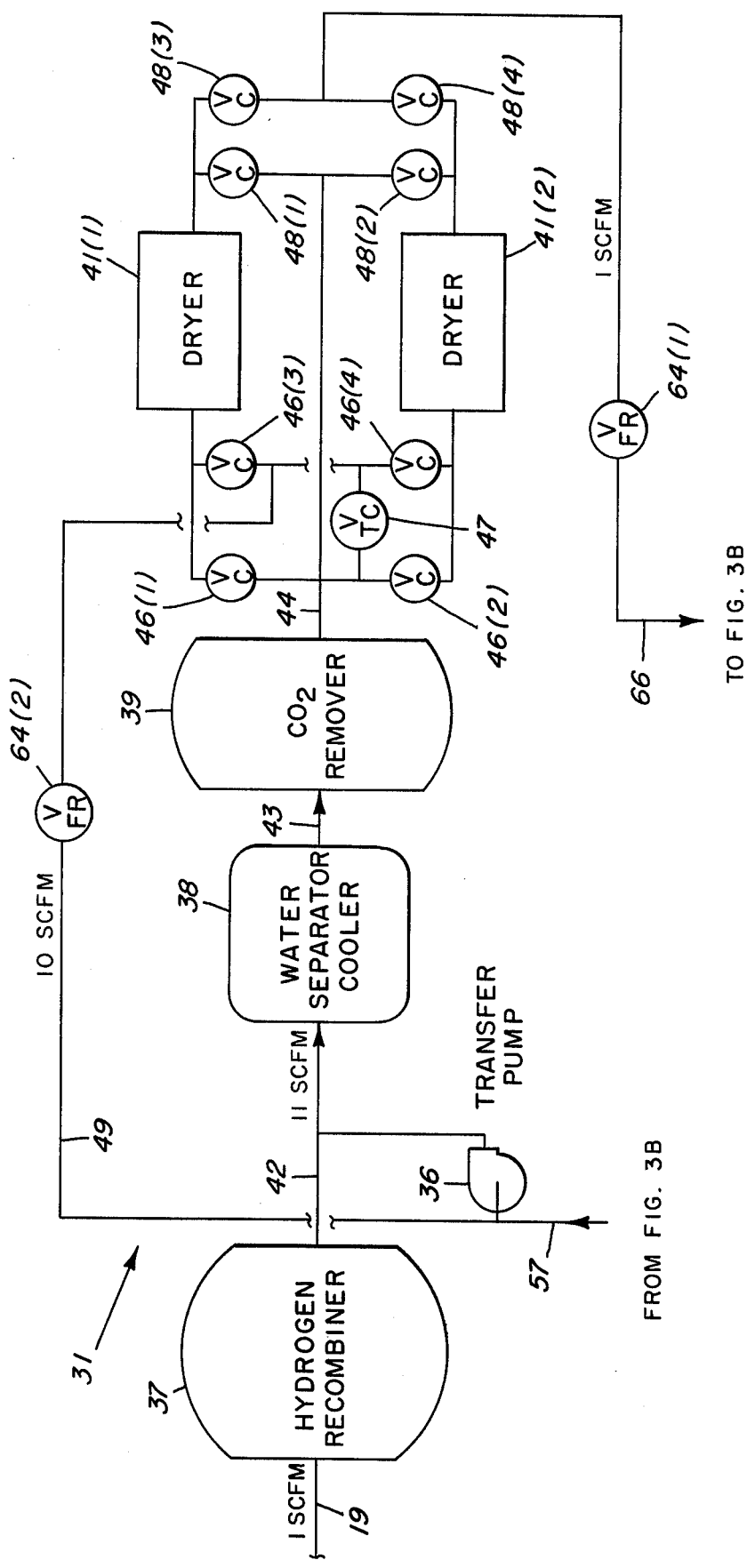
FIG. 3A is a diagrammatic illustration of a gas pre-conditioning system.

A gas removal system (employing a "single stage" separation system) is shown diagrammatically in FIGS. 3A, 3B and 3C. Conveniently, the system may be considered as comprising three major portions as shown in FIG. 1, namely, a gas pre-conditioning system 31 (FIG. 3A), a noble gas separation system 32 (FIG. 3B) and a gas bottling or storage system 33 (FIG. 3C). Certain components may be common to the removal system such as a primary vacuum pump 34 and a transfer vacuum pump 36, the pump 34 being the prime mover of the gas through the system.

For purposes of the present description it is assumed that this example system is designed to receive a gas feed stream volume on line 19 of 1 SCFM (standard cubic feet per minute).

As mentioned hereinbefore, the off gas from a reactor includes water vapor, uncombined hydrogen and oxygen and a substantial quantity of air. The purpose of the pre-conditioning system 31 is to remove a substantial quantity of these substances to thereby reduce the volume of gas that the noble gas separation system 32 must handle and to prevent their interference with the operation of the separation system.

The pre-conditioning system 31 comprises, for example, as shown in FIG. 3A, a hydrogen recombiner system 37, a water separator-cooler 38, a carbon dioxide removal system 39 and a pair of dryer assemblies 41(1) and 41(2).

Input gas from line 19 (see FIG. 1) is applied to the hydrogen recombiner system 37 wherein the free oxygen and hydrogen is recombined in well-known manner and a substantial portion of the resulting water is removed. Several suitable recombiner devices are known such as the catalytic type discussed in the previously mentioned Schroeder et al article and such as the burner type described in U.S. Pat. No. 3,740,313. In addition to the recombiner device the recombiner system 37 normally includes a water separator and a cooler for the outlet gas.

Gas from the recombiner system 37 is conducted via a line 42 to the water separator-cooler 38 of suitable known type (such as a glycol heat exchanger) wherein the temperature of the gas is further cooled to below the dewpoint (for example, about 44° F) of the remaining water vapor whereby further moisture is removed.

Since carbon dioxide interferes with the adsorption of the noble gases on activated carbon, the gas is taken from the separator-cooler 38 and is next applied to the carbon dioxide remover 39 which may be a vessel containing a bed of suitable carbon dioxide absorbent (such as Mallcosorb). It is found desirable to reduce the carbon dioxide content of the gas to the 100 ppm (parts per million) range.

It is noted that while the example system is designed for an input gas capacity of one SCFM, the separator-cooler 38 and the carbon dioxide remover 39 must have a flow capacity of about 11 SCFM because of accumulation of gas in the system due to recirculation as described hereinafter.

Pre-conditioning of the gas stream is completed in dryers 41(1) and 41(2) to which the gas is applied from carbon dioxide remover 39 through a line 44. Each of the dryers 41(1) and 41(2) comprises a molecular sieve desiccant bed and cooling means by which residual moisture is removed from the gas stream and the gas is dried to about −100° F frostpoint.

Two dryer units 41(1) and 41(2) are provided so that one can be on line while the other is being regenerated, the flow through the dryer being controlled by a plurality of inlet valves 46(1)–46(4) and a plurality of outlet valves 47(1)–47(4).

For purposes of explanation assume that dryer 41(1) is on-line while dryer 41(2) is being regenerated. For this condition, valves 46(1), 46(4), 48(2) and 48(3) are open while valves 46(2), 46(3), 48(1) and 48(4) are closed. A portion of the gases on line 44 are thus directed through valve 46(1), through the on-line dryer 41(1), valve 48(3) and through a flow rate control valve 64(1) to a line 66, the input line to removal system 32, the gas flow through on-line dryer 41(1) to the line 66 being limited to about 1 SCFM by the flow rate control valve 64(1).

Meanwhile the remaining 10 SCFM gas of the 11 SCFM volume of input gas to the dryer system on line 44 is directed in a reverse direction through dryer 41(2) to a recirculation line 49 via valves 48(2), 46(4) and 64(2), the latter being a flow rate control valve. Motive force is provided by pump 36 by which the recirculated gas is applied to the inlet of separator-cooler 38.

Each of the dryers 41(1) and 41(2) contains gas heating means (not shown) by which the recirculated regeneration gas can be heated to drive the moisture out of the dryer desiccant bed. When the desiccant bed reaches a suitable temperature (for example, about 400° F) it can be considered regenerated and a temperature controlled bypass valve 47 can be opened to direct the recirculation gas stream directly from line 44 through valve 64(2) to line 49 instead of through the dryer 41(2).

In the example system each dryer 41(1) and 41(2) comprises a bed of about 70 pounds of desiccant material, such as 4A molecular sieve, and a regenerated bed provides about 10 days of drying.

The removal system 32, FIG. 3B, which receives the preconditioned gas from preconditioning system 31 via line 66, comprises a pair of temperature chambers 82(1) and 82(2) containing parallel noble gas adsorption beds or columns 51(1) and 51(2), a plurality of inlet control valves 52(1), 52(2), 53(1) and 53(2), a plurality of outlet control valves 54(1)–54(3) and 55(1)–55(3), a plurality of flow rate control valves 56(1), 56(2) and 56(3), and a pressure control valve 58. The vacuum pump 34 maintains a relatively low pressure on a line 59 and, through pressure control valve 58, a relatively high pressure on a line 65.

A step-by-step description of the operation of the noble gas removal system 32 is presented hereinafter. Briefly, it is arranged that one of the columns 51(1) or 51(2) receives the input gas (as in step 1 of FIG. 2) while the other column is processed through the steps 2–4 of FIG. 2. The outlet gas from the column being so processed fed through a recycle line 57 and through transfer pump 36 to the input of the water separator-cooler 38 by which the gases are recycled through the system whereby the noble gases are concentrated.

After the noble gases have been concentrated to the desired degree (for example, about 10,000 ppm krypton) by recycling through the removal system 32, they are transferred for bottling or storage to the storage system 33.

The storage system 33 (FIG. 3C) comprises a storage column 61, containing a suitable adsorbent such as activated carbon, an inlet control valve 62 and an outlet control valve 63. The column 61 is contained in a temperature chamber 60 by which the temperature of the adsorbent bed therein may be controlled.

The storage column 61 is maintained at a low temperature and it is sized to accommodate the noble gas accumulation capacity of the removal system 32. In the example system of FIG. 3C the storage column 61 is about 8 inches in diameter and 5 feet high, is maintained at about −90° F, it contains about 62 pounds of activated carbon and transfer is made from the removal system about once every 6 months of normal reactor operation. It is designed to handle about 250 cubic feet of air (at standard conditions of 1 atmosphere and 70° F) containing no more than 1 volume percent of the noble gases krypton and xenon.

To carry out the steps of the process of the invention (FIG. 2), the adsorber material in the columns 51(1) and 51(2) of the removal system 32 must be cycled between a low temperature (for example, −90° F) and a high temperature (for example. 225° F).

Figure 4:
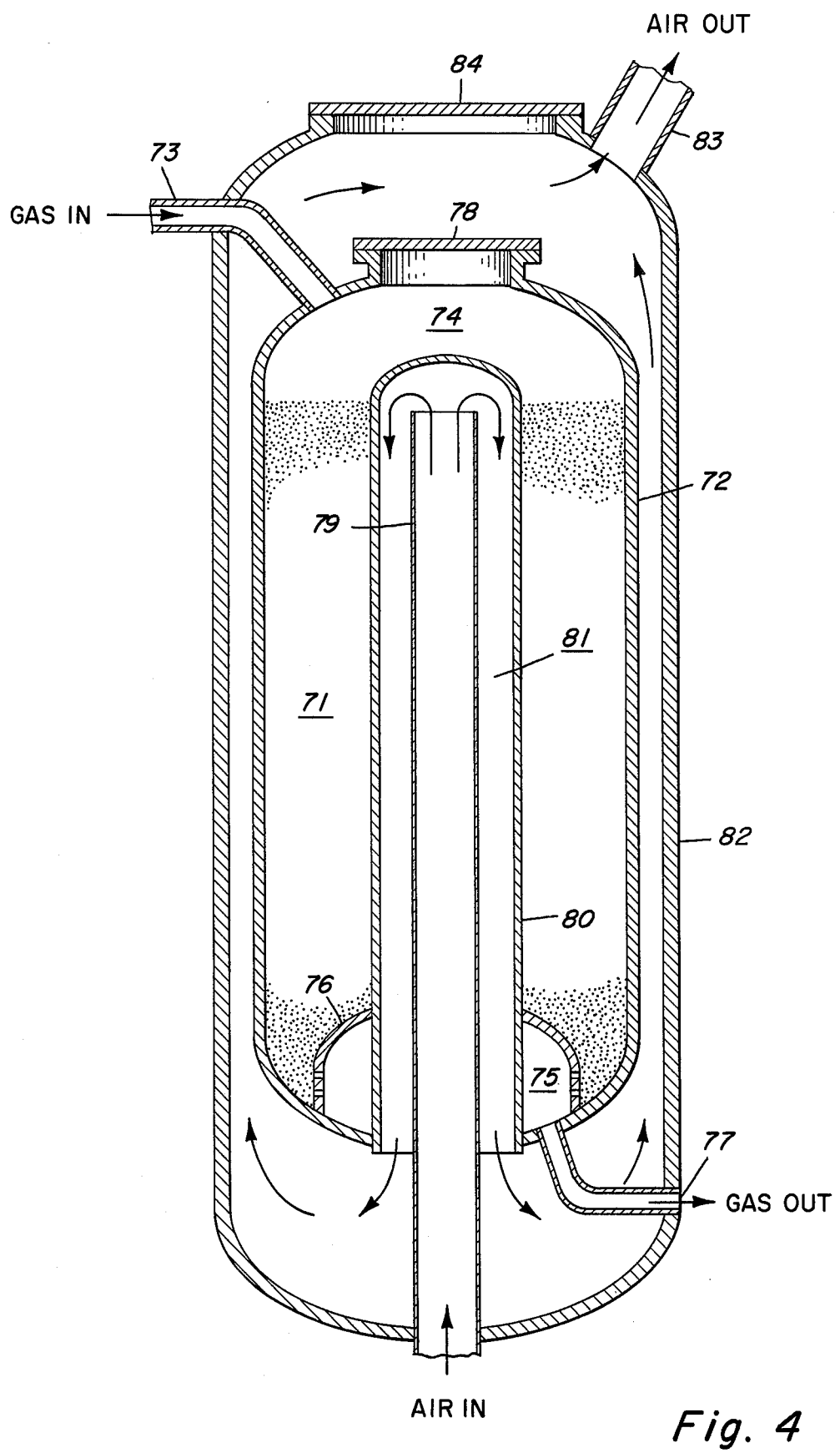
FIG. 4 is an elevation view, in longitudinal cross section, of a temperature chamber containing an adsorber column.

A suitable adsorber containing arrangement and temperature chamber for the columns 51(1) and 51(2), using forced air heating and cooling, is shown in FIG. 4. A bed of adsorber material 71 is contained in a suitable vessel 72. A pipe 73 is secured to the upper dome of the vessel by which input gases are admitted to a space 74 above the adsorber bed 71. The gases thus pass downward through the adsorber bed to a space 75 provided by a perforated dome-shaped member 76. The unadsorbed gases exit the vessel 72 through a pipe 77 secured to the bottom dome of the vessel. A hatch 78 provides access to the interior of the vessel 72 for deposit or removal of the adsorber material of bed 71.

A forced-air concentric flow temperature chamber arrangement is provided for temperature cycling of the adsorber bed 71. A central tube 79 and a concentrically positioned tube 80 extend through the center of the adsorber bed 71. Temperature conditioning air traverses the central tube 79 and is turned downward, by the closed end of tube 80, through an annular passage 81 for heat exchange with the wall of tube 80 and hence with the adsorber bed. Heat exchange between the air in central tube 79 and annular passage 81 tends to maintain a constant temperature of air along the annular passage 81 for even heating or cooling of the adsorber bed. Air exiting the open bottom end of tube 80 is directed upward along the outside surface of vessel 72 by a temperature chamber comprising an outer vessel or shell 82 for further heat exchange between the air and the adsorber bed, the air exiting the shell 82 through an outlet 83. The shell 82 is provided with an access hatch 84.

For use in the example system of FIG. 3B the vessel 72 is 14 inches in diameter and the tube 80 is 8 inches in diameter. The adsorber bed 71 has a height of 6 feet and contains 150 pounds of activated carbon. Two such adsorber structures are connected in series to form each of the adsorber columns 51(1) and 51(2) of FIG. 3B.

Operation of the noble gas removal system 32 will now be described in greater detail with reference to FIG. 3B and to the chart of FIG. 5 which illustrates a 16 hour operating cycle of the system. For a 1 SCFM gas input flow rate through line 19 to the preconditioning system 31, the input gas flow rate on the line 66 to the removal system 32 is about 1 SCFM. This conditioned input gas is mostly air with trace amounts of other gases such as water vapor, carbon dioxide, and the radioactive gases such as krypton, xenon and iodine.

For the present example of operation, inlet valve 53(1) and outlet valve 55(3) are open whereby the adsorber column 51(2) is "on line" to receive the gas on line 66 from the pre-conditioning system 31, to adsorb the noble gases and to vent the unadsorbed gases to line 35. In other words, adsorber column 51(2) is in step of 1 of the basic method of operation as illustrated in FIG. 2 and it remains in this mode for the 16 hours of the cycle.

Meanwhile it is assumed that adsorber column 51(1) has just been taken "off line" and is ready for processing as illustrated by FIG. 5. This processing constitutes the steps 2 through 4 of the basic method illustrated in FIG. 2. FIG. 5 thus illustrates the six steps or time periods for the processing of adsorber column 51(1).

During time period No. 1, valves 52(1) and 52(2) are closed while valve 54(2) is open. This connects an outlet line 50(2) through flow rate control valve 56(1), line 59, and pump 34 to the vent line 35 by which the pressure in adsorber column 51(1) is reduced to vent the unadsorbed gases and to distribute the adsorbed gases along the adsorber bed as in step 2 of FIG. 2.

During time period No. 2, valve 52(2) is open while valves 52(1) and 54(1)–54(3) are closed. This connects an input line 50(1) for reverse flow from column 51(1) through flow rate control valve 56(2), line 57 and transfer pump 36 to the input line 42 of separator-cooler 38. Also, the temperature of column 51(1) is elevated while the pressure therein is reduced. This corresponds to step 3 of FIG. 2 by which the adsorbed gases are desorbed and substantially removed from the column 51(1) and added to the input gas stream in line 42 for recycling to the on-line adsorber column 51(2) for further concentration.

Alternatively, the desorbed gases removed during time period No. 2 are directed into the storage system 33. This will be done when the noble gases reach a desired concentration (for example, about 10,000 ppm krypton) by the recycling thereof described above which, for the example system, may be about once every 6 months of operation. Control valve conditions for this transfer to storage are as follows: control valve 52(2) is open while all other control valves of the removal system 32 are closed and valves 62 and 63 of the storage system 33 are open. Thus desorbed gases from adsorber column 51(1) are recycled through the preconditioned system 31 and are directed from line 66 through valve 62 to the storage column 61, the storage column 61 being at low temperature and high pressure as in step 1 of FIG. 2 whereby the noble gases are adsorbed on the upstream portion of storage column 61.

After a sufficient time to transfer the noble gas to the storage column 61, the inlet valve 62 is closed while the column continues to be under vacuum (low pressure from line 59) whereby the noble gases are distributed along the column and other gases, such as nitrogen and oxygen are removed, as shown in step 2 of FIG. 2.

At the end of this pump-down period the adsorber storage column 61 is capped and removed for storage. The removed column is replaced with a fresh storage column. The filled or saturated column is allowed to heat to ambient temperature. The size of the adsorber bed in the column and the degree of pump-down are selected so that at ambient or storage temperature the pressure in the saturated storage column vessel is slightly below atmospheric pressure. This alleviates the problem of noble gas leakage from the stored column.

Reference is made to the previously mentioned copending application Ser. No. 642,461 for a detailed description of the structure and operation of the storage system 33 of FIG. 3C.

Returning now to the further processing of column 51(1), during time period No. 3 valve 54(1) is open to admit, through flow rate control valve 56(3), for reverse flow through column 51(1), a portion of the gases being vented from the on-line column 51(2). These vented gases, which are free of noble gases, thus act as a purge gas to clear the column 51(1) of residual traces of noble gases, this purge gas being fed through open valve 52(2) via line 57 and pump 36 to line 42 for recirculation through the system.

During time period No. 4 valve 52(2) is closed to cut off gas flow through the column 51(1). The column is cooled to its low temperature and valve 54(1) remains open to allow the pressure in column 51(1) to rise to the high pressure in line 65.

During time period No. 5 the inlet and outlet valves associated with column 51(1) are closed and the adsorber column 51(1) is in standby condition at its lower temperature and higer pressure.

This completes the 16 hours operating cycle. During the next operating cycle the adsorber column 51(1) is placed on-line by opening valves 52(1) and 54(3) and the column 51(2) is then processed in the same manner as the processing of column 51(1) described above.

It is contemplated that suitable control means are provided for automatic control of the system. For example a suitable sequence controller 40(FIG. 3B) may be used to control electric valve operators (not shown) for the control valves (legended V/C) of the system. Control may be based primarily on timed steps as shown in FIG. 5. Thus the controller 40 may include a well-known suitable programmed timing device for providing signals to the control valve operators. For some steps it may be desirable to override the time period by other process indications. For example, signals from a plurality of pressure sensors 45(1)–45(3), connected to sense pressures in respective columns 51(1), 51(2) and 61, may be used to terminate pump-down of the columns (as in time period No. 2 of FIG. 5) if the column pressure reaches the desired pressure before the end of the time period.

SECOND EMBODIMENT

Figure 6:
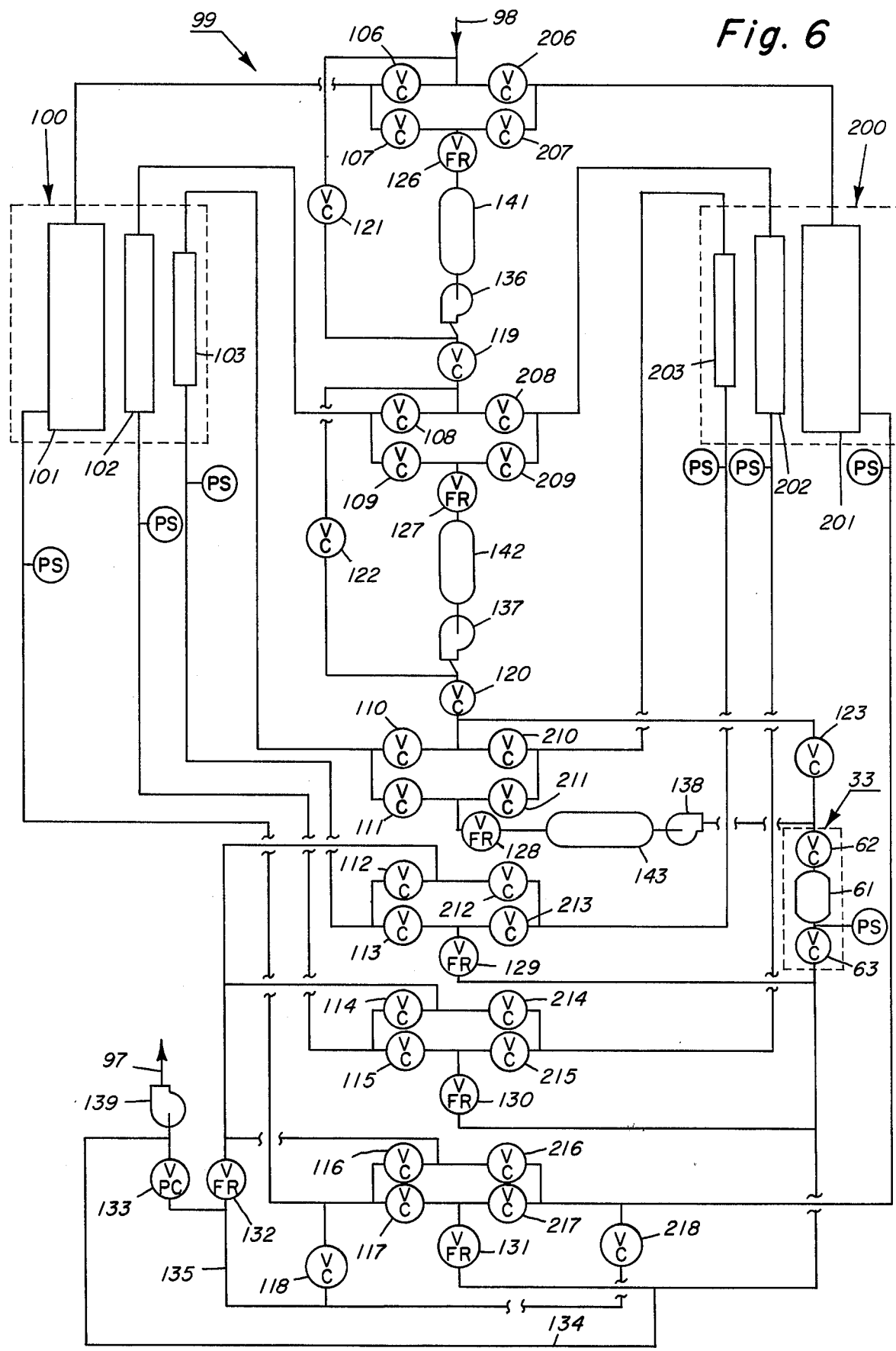
FIG. 6 is a diagrammatic illustration of a gas removal system employing three-stage, parallel separation systems.

Illustrated schematically in FIG. 6 is another embodiment of a noble gas removal system. The removal system 99 of FIG. 6 may be considered a "three-stage"

system as compared to the "single-stage" removal system 32 of FIG. 3B. Thus each of two parallel temperature controlled chambers 100 and 200 contains three adsorber columns 101-103 and 201-203, respectively. Each of the three adsorber columns for each chamber may be housed in a single shell or vessel and arranged for temperature cycling in a manner similar to that shown in FIG. 4 hereinbefore described.

An example of the system 99 of FIG. 6 receives 1 SCFM of gas on an input line 98. This preconditioned gas is mostly air containing trace amounts of other gases including krypton and xenon amounting to about 1 ppm and 0.1 ppm respectively.

For this example system, the adsorber material may be activated carbon suitable for selective adsorption of krypton and xenon from the gas mixture defined above. This first stage adsorber columns 101 and 201 contains about 270 pounds of activated carbon, the second stage columns 102 and 202 contain about 21 pounds and the third stage columns 103 and 203 contain about 2 pounds.

In addition to the adsorber columns, the removal system 99 includes a plurality of control valves 106-123 and 206-218, a plurality of flow rate control valves 126-132, a pressure control valve 133, transfer vacuum pumps 136-138, a main vacuum pump 139 and carbon dioxide and water removal systems or "dryers" 141-143. The dryer systems 141-143 are employed during noble gas transfer between stages. While the preconditioning system 31 removes a substantial portion of the carbon dioxide and water from the input gases, it is desirable to provide the interstage systems 141-143 to remove the residual carbon dioxide and water that becomes concentrated, along with the noble gases, in the operation of the multistage system 99 of FIG. 6.

The dryers 141-143 are not shown in detail since they may be any well known type that meet the following requirements for the example system. The carbon dioxide and water removal system 141 must handle about 0.4 SCFM of gas of about one percent carbon dioxide and about one percent water and it should remove water to about 2 ppm and reduce the carbon dioxide to about 100 ppm. The system 142 must handle about 0.1 SCFM of input gas of about one percent carbon dioxide and about one percent water and it should remove water to about 2 ppm and reduce the carbon dioxide to about 100 ppm. The system 143 must handle about 0.02 SCFM of input gas of about one percent carbon dioxide and about one percent water and reduce these to about 100 and 2 ppm, respectively.

Also shown in FIG. 6 is the storage system 33 which may be similar to that shown in FIG. 3B. It is repeated for convenience of explanation of the operation of the removal system 99.

Operation of the system 99 will be described as a series of six time periods of operation over a 16 hour operating cycle. As the initial condition it is assumed that the adsorber column 201 of chamber 200 is on-line receiving the input gases from line 98 through open valve 206 and discharging exit gases through open valve 218, a line 135, pressure control valve 133 and pump 139 to a vent line 97. In other words the adsorber column 201 of chamber 200 is removing the noble gases from the inlet stream over the 16 hours of the operating cycle as in step 1 of FIG. 2.

It is further assumed that the adsorber column 101 of chamber 100 has been on-line during the previous 16 hour cycle and is now ready for reprocessing generally as in steps 2-4 of FIG. 2. In the following description of the six time periods of the cycle, open control valves will be designated. All other control valves are assumed to be closed except for valves 206 and 218 which are open throughout the cycle.

In the example system, pressures in the adsorber columns are cycled between high and low negative pressure. In the following description of FIG. 6, "high pressure" means a pressure of about 0.9 atmosphere absolute while "low pressure" shall mean a pressure of about 0.1 atmosphere absolute.

The main vacuum pump 139 maintains the low pressure (high vacuum of about 0.1 atmosphere) on a line 134 while the pressure control valve 133 maintains the high pressure (low vacuum of about 0.9 atmosphere) on a line 135.

Also in the example system, the chambers 100 and 200 are cycled between low and high temperatures. In the following description of FIG. 6 "low temperature" shall mean a temperature of about $-90°$ F while "high temperature" shall mean a temperature of about $225°$ F.

With these assumptions, operation of the system 99 of FIG. 6 during the six time periods of an operating cycle is as follows:

Time period No. 1, duration 2 hours: control valves 113, 115 and 117 are open to connect the adsorber columns 101, 102, and 103, respectively via line 134 through pump 139 to vent line 97 which the pressure in these columns is reduced and the non-adsorbed gases, such as air, are removed as in step 2 of FIG. 2, the temperature in chamber 100 being maintained at its low value. The pump-down rates for columns 101, 102 and 103 are about 1.7, 0.25 and 0.02 SCFM as determined by flow rate control valves 129, 130 and 131, respectively.

Time period No. 2, duration 4 hours: during this time period the adsorber columns 101, 102 and 103 are pumped down in the reverse direction to low pressure and the chamber 100 is heated to its high temperature by which the adsorbed gases are desorbed as in step 3 of FIG. 2. The desorbed gases from column 101 are transferred to the second stage column 202 of chamber 200. The desorbed gases from column 102 are transferred to the third stage column 203; and the desorbed gases from column 103 are transferred to adsorber column 61 of the starage system 33.

These transfers are accomplished as follows. Valves 107, 119, 208 and 215 are open to form a gas flow path from column 101 through flow rate control valve 126, dryer 141, pump 136, column 202, line 134 and pump 139 to the vent line 97. Valves 109, 120, 210 and 213 are open to form a gas flow path from column 102 through flow rate control valve 127, dryer 142, pump 137, column 203, line 134 and pump 139 to the vent line 97. Valves 111, 62 and 63 are open to form a gas flow path from column 103 through flow rate control valve 128, dryer 143, pump 138, column 61 of storage system 33, line 134 and pump 139 to the vent line 97.

Vacuum pumps 136-138, through flow rate control valves 126-128, reduce and maintain the pressures in columns 101-103 at low values while vacuum pump 139, (through flow rate control valves 130 and 129) maintains high pressure in columns 202, 203 and 61. In others words, columns 101, 102 and 103 are in a desorption condition (as in step 3 of FIG. 2) while columns 202, 203 and 61 are in an adsorption condition (as in step 1 of FIG. 2). Pumpdown rates for columns 101, 102 and 103 are about 0.6, 0.05 and 0.005 SCFM, respectively.

Differences between the single stage removal system 32 of FIG. 3B and the three stage removal system 99 of FIG. 6 can now be noted. In the single stage system the noble gases are concentrated by recirculation through the system and the concentrated gases are transferred to the storage system at infrequent intervals. In the multiple stage system concentration of the noble gases is accomplished by successive transfer to successive stages or adsorber columns whereby the columns can be successively smaller. The thus concentrated noble gas is transferred to the storage system during the above described time period No. 2 of each 16 hour operating cycle whereby high concentrations of the noble gases are not retained in a large mass of adsorbent.

Time period No. 3, duration 4 hours: During this time period the adsorber columns 101, 102 and 103 are purged in the reverse direction (with a portion of the exit or effluent gas from on-line adsorber column 201) for cleanup as in step 4 of FIG. 2, the chamber 100 being at its high temperature. The exit purge gases from columns 101-103 of chamber 100 are also directed in a forward direction through columns 201-203 of chamber 200 at high pressure to remove the non-adsorbed gases from columns 202 and 203 as in step 2 of FIG. 2, the chamber 200 being at its low temperature. This is accomplished as follows:

Valves 112, 114 and 116 are open to admit (through open valve 218 and flow rate control valve 132) a portion of the exit gases from on-line adsorber column 201 to columns 103, 102 and 101 in a reverse direction.

The exit gases from column 101 are pumped by pump 136 through open valve 107, flow rate control valve 126, dryer 141, the vacuum pump 136, and open valve 121 whereby these gases are added to the input gases from line 98 through open valve 206 to the first stage adsorber column 201 of chamber 200.

The exit purge gases from column 102 are pumped by pump 137 through open valve 109, flow rate control valve 127, dryer 142, the vacuum pump 137, and open valves 122 and 208 to the second stage adsorber column 202 of chamber 200. Exit gases from column 202 are directed through open valve 215 and flow rate control valve 130 to the low pressure line 134 and thence through main pump 139 to the vent line 97.

The exit purge gases from column 103 are pumped by pump 138 through open valve 111, flow rate control valve 128, dryer 143, the vacuum pump 138, and open valves 123 and 210 to the third stage adsorber column 203 of chamber 200. Exit gases from column 203 are directed through open valve 213 and flow rate control valve 129 to the low pressure line 134 and through pump 139 to the vent line 97.

Time period No. 4, duration 3 hours: during this time period the chamber 100 is cooled from its high temperature to its low temperature. Inlet valves 106-111 are closed. However, valves 112, 114, and 116 remain open by which the outlets of columns 101, 102 and 103 are connected through flow rate control valve 132 to the high pressure line 135 whereby these columns are maintained at high pressure.

Time period No. 5, duration 3 hours: during this time period the adsorber columns 101, 102 and 103 of chamber 100 are in a standby condition at low temperature ready to be placed on-line at the beginning of the next operating cycle.

During the next operating cycle, adsorber column 101 will be placed on-line and the chambers 201-203 will be processed in a manner similar to the processing of columns 101-103 described above.

While not illustrated in FIG. 6, it is contemplated that automatic control means, such as a controller similar to controller 40 of FIG. 3B, may be provided to actuate the control valves and otherwise control the system of FIG. 6 through the process sequences described.

While the example systems as herein described have an input feed gas capacity of 1 SCFM such systems can be scaled, up or down as desired, to accommodate the required quantity of feed gas.

Thus what has been described is a gas separation system capable of achieving high concentrations of the adsorbed gases with a minimum number of separation stages and a minimum amount of equipment.

What is claimed is:

1. In a processing system for processing a stream of a gas mixture including a relatively small portion of predetermined gas mixed with other gases. a process for removing said predetermined gas from said gas mixture and concentrating said predetermined gas comprising the steps of:

(1) providing a gas preconditioning system having an inlet and an outlet and including means for removing selected gases from said gas mixture;

(2) directing said gas mixture into said inlet of said preconditioning system to thereby provide a preconditioned gas mixture at said outlet of said preconditioning system;

(3) providing a gas separation system including first and second adsorber columns each including a bed of adsorbent having high selectivity for said predetermined gas in a container having inlet and outlet passages, said preconditioning system having a gas handling capacity which is multiple of the gas processing capacity of said gas separation system;

(4) directing all but a predetermined portion of said preconditioned gas mixture from said outlet of said preconditioning system to the inlet thereof for recirculation therethrough;

(5) directing said predetermined portion of said preconditioned gas mixture from said outlet of said preconditioning system into said inlet passage of said first column of said separation system and into the first column bed thereof while said column is at a low temperature and a high pressure favorable for adsorption of said predetermined gas on said adsorbent whereby an adsorbate of said predetermined gas and co-adsorbed other gases is adsorbed only on an upstream portion less than the full length of said first column bed while the remainder of said other gases free of said predetermined gas are exhausted through said outlet passage of said first column and vented from said processing system;

(6) directing said predetermined portion of said preconditioned gas mixture into said inlet passage of said second column and into the second column bed in accordance with the conditions of said step (5) when said upstream portion of said first column bed becomes saturated;

(7) closing said inlet passage of said first column when said upstream portion of said first column bed becomes saturated and reducing the pressure therein from said high pressure to a low pressure favorable for desorption of said adsorbate from said adsorbent by pump-down through said outlet passage of said first column for removing from said first column bed and venting from said processing system a portion of said co-adsorbed other gases, and terminating said pump-down short of breakthrough of said predetermined gas from said bed whereby the vented gases are free of said predetermined gas;

(8) closing said outlet passage of said first column and increasing the temperature of said first column bed above said low temperature to a high temperature favorable for desorption of said predetermined gas from said absorbent while reducing the pressure in said first column by pump-down through said inlet passage of said first column to desorb and remove said predetermined gas and co-adsorbed other gases from said first column bed and directing the thus removed gases into said inlet of said preconditioning system for recirculation therethrough whereby the concentration of said predetermined gas in said preconditioned gas mixture is increased.

2. The process of claim 1 including the further step of directing effluent gas from said second column into said outlet passage of said first column and through said first column bed to purge said bed of residual traces of said predetermined gas and directing said effluent gas from said inlet passage of said first column to said inlet of said preconditioning system for recirculation therethrough.

3. The process of claim 1 including the further step of periodically directing the gases from the outlet of said preconditioning system into a gas storage container.

4. The process of claim 3 wherein said storage container contains a bed of adsorbent having high selectivity for said predetermined gas.

5. The process of claim 1 wherein said upstream portion comprises 50 to 75 percent of the length of said bed.

6. The process of claim 1 wherein said high pressure is a subatmospheric pressure.

7. The process of claim 1 wherein said high pressure is about 0.9 times atmospheric.

8. The process of claim 1 wherein said low pressure is about 0.1 times atmospheric.

9. The process of claim 1 wherein said low temperature is between $-40°$ and $-105°$ F.

10. The process of claim wherein said high temperature is between $100°$ and $300°$ F.

* * * * *